K. LINDSAY.
SAW HOLDER.
APPLICATION FILED MAY 10, 1920.
1,380,814. Patented June 7, 1921.
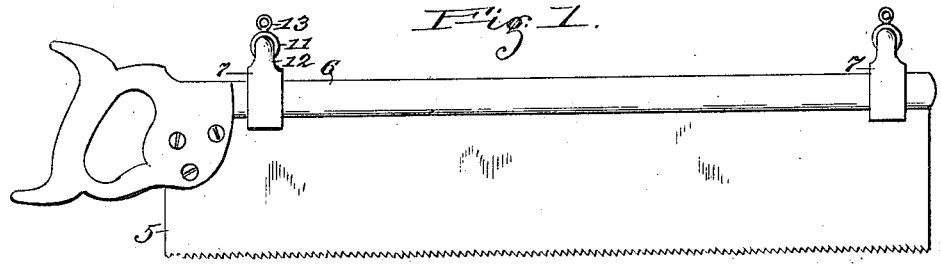
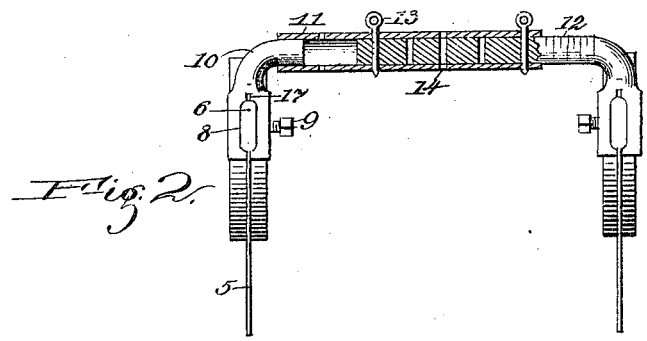
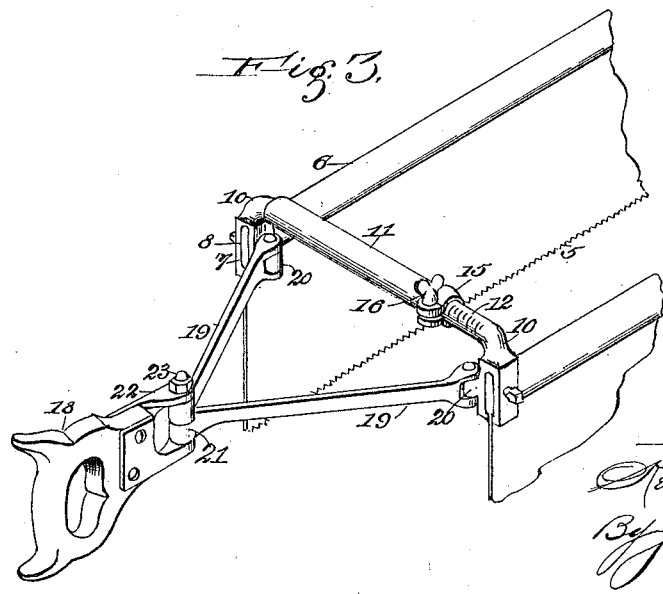

UNITED STATES PATENT OFFICE.

KENNETH LINDSAY, OF CEDAR RAPIDS, IOWA.

SAW-HOLDER.

1,380,814.      Specification of Letters Patent.      Patented June 7, 1921.

Application filed May 10, 1920. Serial No. 380,078.

*To all whom it may concern:*

Be it known that I, KENNETH LINDSAY, a citizen of the United States, residing at Cedar Rapids, in the county of Linn and State of Iowa, have invented certain new and useful Improvements in Saw-Holders, of which the following is a specification.

This invention relates to hand-saws; and the object of the invention is to provide convenient means for connecting a pair of saws in parallel position, and for varying the distance between the saws as so connected, so that in the sawing of gains and the like successively the operation may be easily and accurately performed, without measuring the space between saw-kerfs.

The invention is fully disclosed in the description and claims following, reference being had to the accompanying drawing, in which—

Figure 1 is a side elevation of a device embodying my invention. Fig. 2 is a view of the same as seen from the right end of Fig. 1, a part of the yoke being in section. Fig. 3 is a view in perspective, showing means for connecting a single handle to a pair of saws, and a modification of the means for fastening the yokes.

In the drawing, the numeral 5 denotes an ordinary hand-saw, commonly known as a "back-saw", being rigidly reinforced at 6 by a rib extending the length of the saw. Fitting these ribs nicely, but slidably, are four clamping heads 7, slotted at 8 to receive the ribs, and provided with set-screws 9 for setting them securely in position. The heads connect by goose-necks 10 with shanks 11 and 12, respectively, standing at exact right angles to the heads. One of the shanks is here shown as tubular, and is suitably secured to the goose-neck, as by welding. The other may be a solid extension of the goose-neck, fitting nicely inside the tube. The pair of them used for a pair of saws is accurately and identically graduated, so that the saws may be precisely spaced at both ends. One of the simplest and most reliable fastenings for the parts of the yokes is pins 13 fitting holes 14 in the shanks, as shown in Figs. 1 and 2. The modified fastening shown in Fig. 3 employs a split collar 15 attached to the tubular shank, and is clamped on the other part of the shank by a thumb-screw 16. This admits of any desired spacing of the saws, within the limits of expansion or contraction of the yokes.

The device, as will be seen, may be attached to any ordinary saw of this type, without any change in the construction or fittings of the saw. Provision is also made for attaching the yokes to thin-backed saws, the thin portion of the slot in the head being extended past the expanded portion, at 17, so as to hold the saw-blade true when clamped by the set-screw.

It will be noted that the adjustment of the yokes is altogether between the saws, and practically nothing projects outside of either saw, to interfere with the operation of the saws in close places, and near adjoining timbers and other parts.

The saws as shown in Fig. 2 will operate satisfactorily as held by either handle, provided, of course, that the yokes are not so long as to produce an excess of side-strain. In Fig. 3 is shown a device whereby the handle is held midway of the saws, and all side-strain is avoided. In this case the regular handles may be detached, or special saws without handles may be used. The single handle 18 is linked to the saws by jointed bars or links 19. These may be hinged directly to the yoke-heads provided with lugs 20, and their opposite ends unite in a single hinge joint 21 connecting with cheek-plates 22 secured to the handle. A bolt 23 serves to clamp the parts tightly together, and hold the handle firmly at any desired angle.

A pair of saws so coupled is very convenient and useful in the sawing of multiple gains, and in many other places where regularly spaced saw-kerfs are many times repeated.

Having thus described my invention, I claim:

1. A holder for a pair of carpenters' saws, comprising a pair of arched yokes, having mutually engaging telescopic shanks, heads to receive and hold the saws at right angles to said shanks, and means for securing the saws rigidly in said heads.

2. A holder for a pair of carpenters' saws, comprising a pair of arched yokes with extensible, mutually engaging shanks, and spaced fastenings, whereby the length of the shanks may be accurately adjusted, heads connecting with said shanks, and slotted to receive saw-backs and hold the saws at right angles to the shanks, and means for securing the saws therein.

3. Combined with a holder for saws composed of a pair of extensible yokes, having heads slotted to receive the backs of saws, and hold the saws at right angles to the shanks, a pair of jointed links connecting with one of said yokes, a handle attached to the links at their connecting joint, and means for holding the handle tightly in position.

In testimony whereof I affix my signature in presence of two witnesses.

KENNETH LINDSAY.

Witnesses:
J. M. St. John,
Augusta Nailen.